(12) United States Patent
Megerle et al.

(10) Patent No.: US 6,254,199 B1  
(45) Date of Patent: Jul. 3, 2001

(54) SOLENOID VALVE FOR A SLIP-REGULATED HYDRAULIC BRAKE SYSTEM OF A VEHICLE

(75) Inventors: Friedrich Megerle; Siegfried Fritsch, both of Sonthofen; Martin Kirschner, Rettenberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,272

(22) PCT Filed: May 28, 1997

(86) PCT No.: PCT/DE97/01075

§ 371 Date: Mar. 2, 2000

§ 102(e) Date: Mar. 2, 2000

(87) PCT Pub. No.: WO98/09855

PCT Pub. Date: Mar. 12, 1998

(30) Foreign Application Priority Data

Sep. 3, 1996 (DE) .............................................. 196 35 693

(51) Int. Cl.[7] ...................................................... B60T 8/36
(52) U.S. Cl. ................ 303/119.2; 251/367; 251/129.02; 137/550; 137/590
(58) Field of Search .............................. 303/119.2, 116.1, 303/9.75; 251/129.02, 367; 137/550, 590, 627.5

(56) References Cited

U.S. PATENT DOCUMENTS

| 4,621,788 | * | 11/1986 | Delew et al. ..................... 251/120 |
| 5,005,919 | * | 4/1991 | Shuey et al. ..................... 303/119 |
| 5,887,956 | * | 3/1999 | Rausch ............................ 303/119.2 |
| 5,931,179 | * | 8/1999 | Megerle et al. .................. 137/15 |
| 5,934,766 | * | 8/1999 | Feigel et al. .................... 303/119.2 |
| 6,084,493 | * | 7/2000 | Siegel ............................. 335/278 |

FOREIGN PATENT DOCUMENTS

| 3225146 | * | 12/1984 | (DE) ............................... 303/119.2 |
| 492109 | * | 6/1992 | (DE) ............................... 303/119.2 |

* cited by examiner

Primary Examiner—Robert J. Oberleitner  
Assistant Examiner—Xuan Le Nguyen  
(74) Attorney, Agent, or Firm—Ronald E. Greigg; Edwin E. Greigg

(57) ABSTRACT

A rod-shaped solenoid valve that is provided for insertion into a receiving bore of a hydraulic block of an antilock hydraulic brake system of a vehicle, wherein a fluid influx takes place through an axial bore of a valve seat part that is inserted into a valve support. For simple sealing, a plastic end piece is placed onto the end of the valve support that prodrudes into the receiving bore and seals the valve support in relation to the receiving bore and also seals the valve seat part.

8 Claims, 2 Drawing Sheets

SOLENOID VALVE FOR A SLIP-REGULATED HYDRAULIC BRAKE SYSTEM OF A VEHICLE

PRIOR ART

The invention is based on a solenoid valve, which is provided for insertion into a receiving bore in a hydraulic block of a slip-regulated hydraulic brake system of a vehicle. It is in particular provided as an inlet valve preceding a wheel brake cylinder or as a reversing valve connected between the master cylinder and the rest of the vehicle brake system.

A valve of this kind has been disclosed by DE 44 12 648. This valve is embodied as rod-shaped and has a rotationally symmetrical valve support with an axial through bore. For the purpose of a hydraulic connection, the valve support is provided for insertion into a receiving bore of a hydraulic block so that an inlet on an end face of the valve support and an outlet on the circumference of the valve support communicate with fluid conduits of the hydraulic block, which feed into the receiving bore in a bottom face or on the circumference.

The valve support protrudes with a part of its length out of the hydraulic block. A valve dome is attached to the protruding end face and receives an armature so that it can move axially. In order to actuate an axially movable valve closing body, a valve tappet is affixed to the armature and protrudes into the through bore of the valve support. For the purpose of electromagnetic actuation, a coil is slid onto the valve dome that protrudes from the hydraulic block.

The valve support is sealed in the hydraulic block by means of two O-rings, which makes manufacture and assembly of the known solenoid valve relatively costly since O-ring grooves have to be let into the valve support and the O-rings must be inserted into the O-ring grooves before the insertion of the solenoid valve into the hydraulic block.

ADVANTAGES OF THE INVENTION

In the solenoid valve according to the invention, with the features of claim 1, an end piece made of plastic is affixed to the end face of the valve support to be inserted into the receiving bore in the hydraulic block and this end piece seals the valve support at the bottom of the receiving bore in relation to the hydraulic block and thus hydraulically separates from one another fluid conduits of the hydraulic block that feed into the receiving bore in the bottom face and those that feed into this bore on the circumference. The manufacture of the solenoid valve according to the invention is simplified by means of the end piece made of plastic in comparison to a seal for example by means of an O-ring, since no O-ring groove has to be produced on the valve support. Likewise, the assembly is simplified in comparison to a conventional O-ring seal by means of caulking or using the self-clinch technique.

Advantageous embodiments and improvements of the invention disclosed in claim 1 are the subject of the dependent claims.

The sealing with the plastic end piece according to claim 3 is particularly advantageous and this end piece both seals the valve support in the receiving bore and rests in a sealed fashion against the valve seat part, i.e. hydraulically separates its bore from the valve outlet.

Preferably, the seals according to claims 2 and 3 are disposed on the end piece so that with the application of pressure through brake fluid, they are more strongly pressed on, so that they seal reliably even stress of the seals as a result of material ageing or temperature influences.

According to claim 4, the end piece seals the valve support against the hydraulic block also at the mouth of the receiving bore, i.e. in relation to the outside. This has the advantage that an additional sealing element or a fluid-tight caulking of the valve support in the hydraulic block is not required.

According to claim 5, a check valve is integrated into the end piece, which produces a return flow function in a simple manner, in which otherwise requires a separate check valve or an expensive and wear-prone the sealing collar that permits a through flow in one direction, in lieu of the end piece.

A valve support produced according to claim 9 by means of extrusion, in particular cold extrusion, has the advantage that it can be produced rapidly and cheaply. This furthermore has the advantage that an inexpensive forming steel can be used for the valve support, which brings with it the property of a favorable capacity for being welded.

BRIEF DESCRIPTION OF THE DRAWINGS

The invention will be explained in more detail below in conjunction with two exemplary embodiments represented in the drawings.

The two

DESCRIPTION OF THE EXEMPLARY EMBODIMENTS

Figure 1:
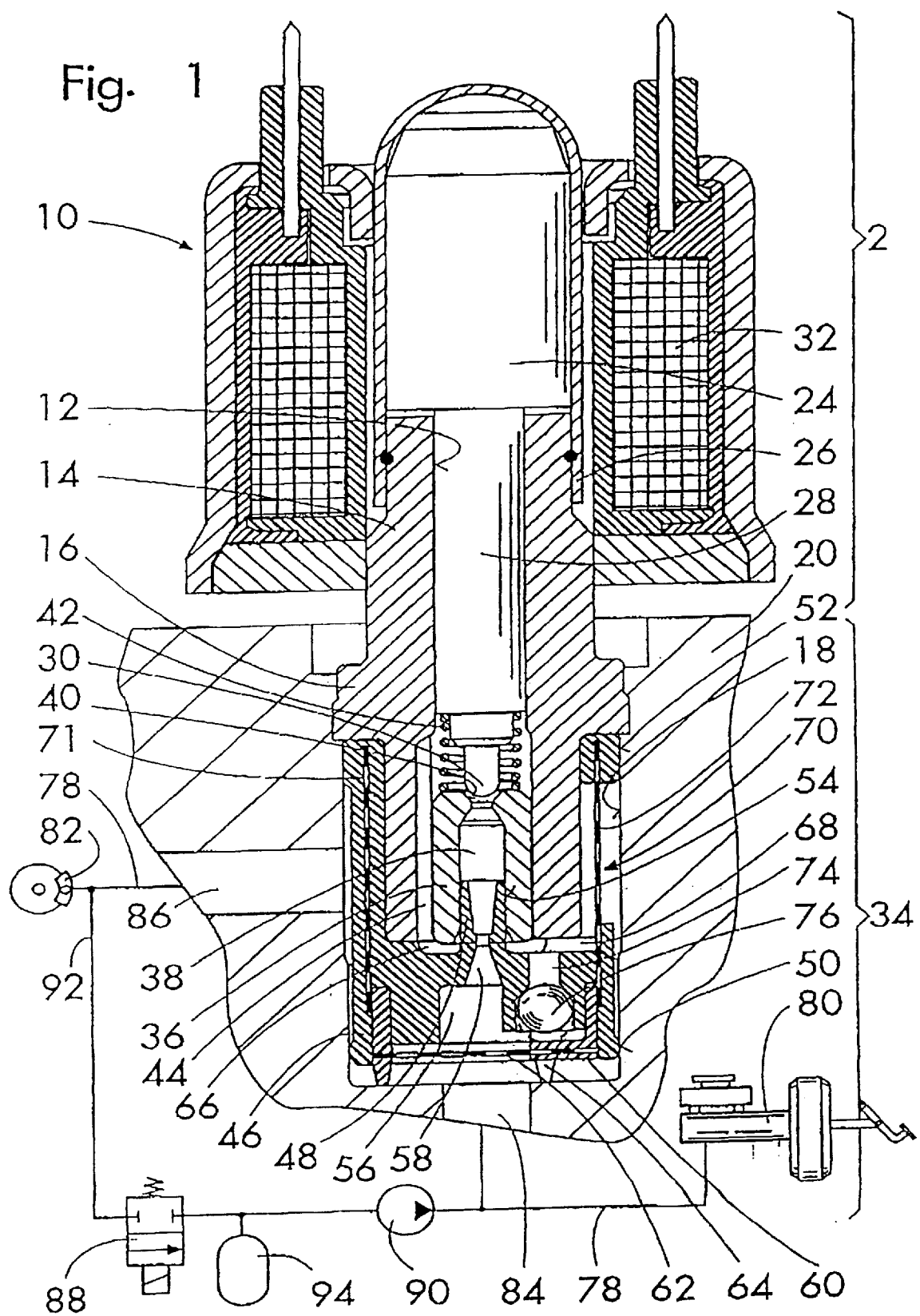
FIGS. 1 and 2 show an axial section through two different embodiments of a solenoid valve.

The rod-shaped solenoid valve 10 according to the invention depicted in FIG. 1 has a rotationally symmetrical valve support 14, which is provided with an axial through bore 12 and has a fastening flange 16 that is an integral part of the valve support and is disposed approximately in the middle of its length. The valve support 14 is inserted into a receiving bore 18 in a hydraulic block 20 and is secured by caulking on its fastening flange 16. A hydraulic part 34 of the solenoid valve 10 is disposed in the hydraulic block 20, a magnetic part 22 protrudes from the hydraulic block 20. The valve support 14 is an extruded part that is produced in one work cycle and does not have undercuts.

On an end face of the valve support 14 remote from the hydraulic block 20, the magnetic part 22 has an axially movable armature 24 contained in a valve dome 26, which is welded to the valve support 14 in a fluid tight manner. A valve tappet 28 extends from the armature 24 into the through bore 12 of the valve support 14, whose end remote from the armature 24 is embodied as a valve closing body 30 in the shape of a half ball. A coil 32 is slid onto the valve dome 26.

The hydraulic part 34 of the solenoid valve 10 according to the invention includes a cylindrical valve seat part 36, which is pressed into the through bore 12 of the valve support 14 from an end face disposed in the receiving bore 18. The valve seat part 36 has an axial bore 38 passing through it, which feeds into a conical valve seat 40 on the end face of the valve seat part 36 oriented toward the valve tappet 28. A helical compression spring 42 is disposed between the valve seat part 36 and the valve tappet 28, and this spring presses the valve tappet 28 away from the valve seat part 36 and consequently lifts the valve closing body 30 up from the valve seat 40; the solenoid valve 10 is therefore open in its normal position when it is without power. Through supplying power to the coil 32, the armature 24 is attracted to the end face of the valve support 14 oriented toward it, i.e. the armature 24 moves together with the valve tappet 28 in the direction of the valve seat body 36 so that the valve closing body 30 is pressed against the valve seat 40 and the solenoid valve 10 is closed. A valve stroke is adjusted by means of the depth to which the valve seat part 36 is pressed into the through bore 12 of the valve support 14.

Axially parallel outflow conduits 44 lead along an outer circumference of the valve seat part 36 to the end face of the valve support 14 disposed in the receiving bore 18. In the exemplary embodiment depicted, the solenoid valve 10 according to the invention has three outflow conduits 44 that have round cross sections and are disposed evenly distributed over the circumference. The outflow conduits 44 are let into a wall of the through bore 12, i.e. in the valve support 14.

A cup-shaped end piece 46 is slid onto the end of the valve support 14 that is inserted into the receiving bore 18. The end piece 46 is comprised of a thermoplastic plastic to which approximately 20% carbon fibers are added as a filler. It is an injection-molded part. A pinshaped projection 48 that is of one piece with the end piece 46 protrudes from the inside of a bottom of the end piece 46 and engages in the axial bore 38 of the valve seat part 36. The end piece 46 has three seals that are of one piece with it, the first seal 50 and third seal 52 are embodied extending around the outer circumference and produce a seal against a circumference wall of the receiving bore 18 in the vicinity of a bore bottom and beneath the fastening flange 16 of the valve support 14. The second seal 54 is produced by the projection 48 that fits in a sealed fashion in the axial bore 38 of the valve seat part 36. The three seals 50, 52, 54 rest with low pressure. At least the first and second seals 50, 54 are acted on from the inside with fluid, i.e. they are pressed more tightly with increasing pressure and as a result, reliably seal even at high pressure and with high pressure differences.

The end piece 46, including its projection 48, has an axial bore 56 passing through it that constitutes an opening and has a throttle location 58.

A filter element 60 is attached to the bottom of the end piece 46 from the outside, which is comprised of a plastic injection-molded part 60, which is injection molded around a plate-shaped filter screen 62. The filter element 60 has three support feet 64 that rest on the bottom of the receiving bore 18 of the hydraulic block 20 and thereby hold the end piece 46 on the valve support 14.

On the end face of the valve support 14 that protrudes into the receiving bore 18, the outflow conduits 44 feed into an annular disk-shaped hollow space 66 that is bordered by the bottom of the end piece 46 and the end face of the valve support 14 and the valve seat part 36 which end face is enclosed by the end piece 46 and disposed in the receiving bore 18 of the hydraulic block 20. Three radial conduits 68 extend outward in a star shape from the hollow chamber 66, which communicate with three openings 70 in a circumference wall 71 of the end piece 46, the circumference wall encompasses the valve support 14. A hollow cylindrical filter screen 72 is injection molded in the circumference wall 71 of the end piece 46 and covers the openings 70.

A check valve is disposed in the bottom of the end piece 46, which valve is comprised of an axially parallel bore 74 that widens out with a conical step toward the bottom of the receiving bore 18 and a ball is inserted into this bore as a valve body 76. The valve body 76 is secured in the bore 74 by the filter element 60.

The hydraulic connection of the solenoid valve 10 according to the invention to an antilock vehicle brake system is symbolically depicted in FIG. 1: the solenoid valve 10 according to the invention is connected in a main brake line 78 that leads from a master cylinder 80 to a wheel brake cylinder 82; it serves as an inlet valve of the wheel brake cylinder 82. The master cylinder 80 thus communicates with the axial bore 38 in the valve seat part 36 by way of a fluid conduit 84 that feeds axially in the bottom of the receiving bore 18. The wheel brake cylinder 82 is connected to a radial fluid conduit 86 that feeds in the circumference of the receiving bore 18, i.e. by means of the openings 70 and the radial conduits 68 of the end piece 46, the wheel brake cylinder 82 communicates with the outflow conduits 44 that lead along the outer circumference of the valve seat part 36. The check valve 74, 76 is embodied as a bypass valve that permit fluid to flow through in the direction from the wheel brake cylinder 82 to the master cylinder 80.

Parallel to the solenoid valve 10, an outlet control valve 88 and a return feed pump 90 are connected in a return line 92 that leads from the wheel brake cylinder 82 to the master cylinder 78. A reservoir 94 is connected to the return line 92 between the outlet valve 88 and the return feed pump 90. The brake slip regulation occurs in a manner that is known in and of itself through brake pressure modulation by means of the solenoid valve 10, which serves as an inlet valve, and by means of the outlet valve 88 and the return feed pump 90.

Figure 2:
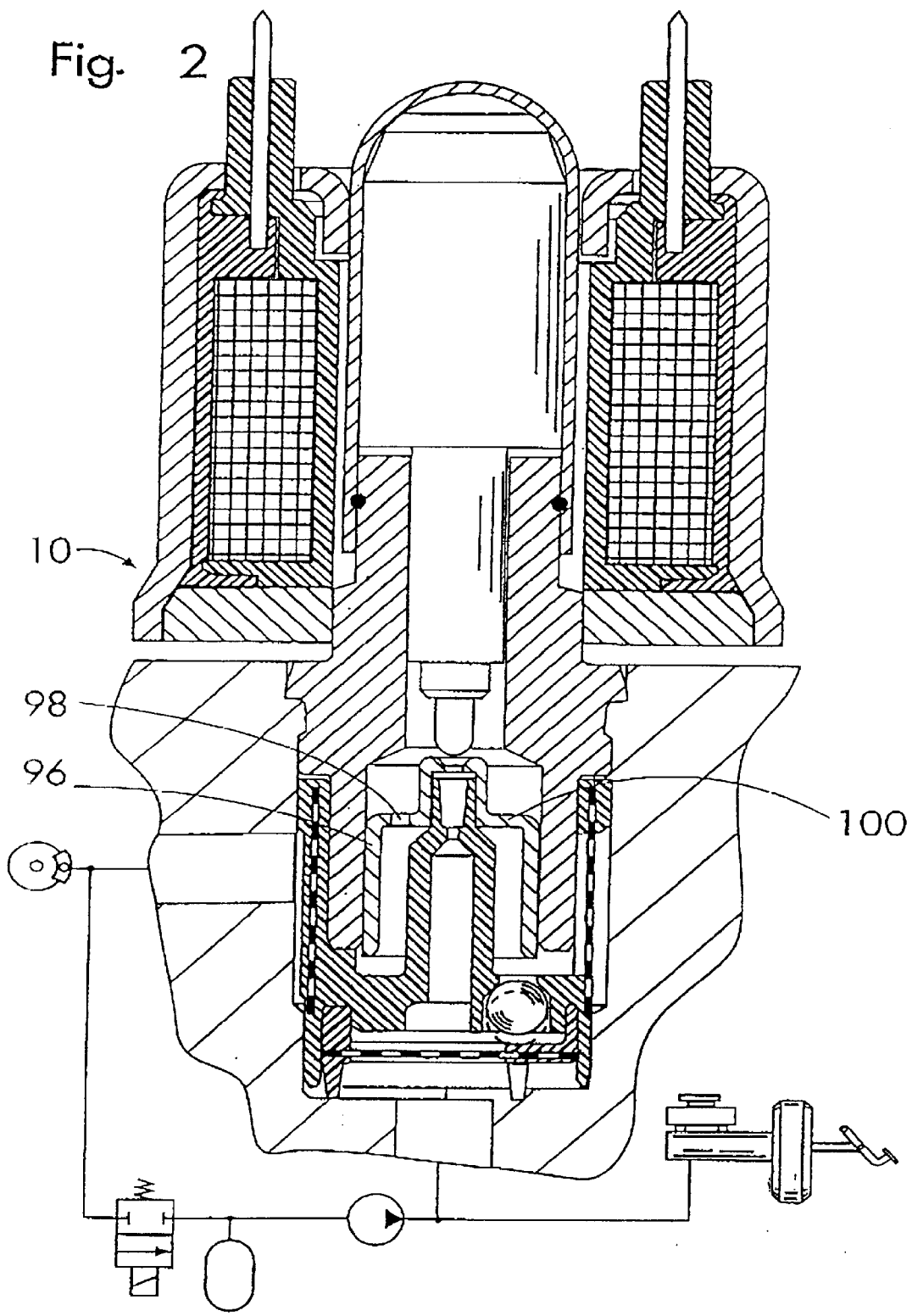

In the modified embodiment of the solenoid valve 10 according to the invention that is depicted in FIG. 2, a valve seat part 96 is embodied as a stepped, cup-shaped deep-draw part made of sheet metal. It has three axially parallel bores 98 that are let into an annular step 100 of the valve seat part 96 and are distributed evenly over the circumference. These bores 98 replace the outflow conduits 44 in the through bore 12 of the valve support 14 of the embodiment of the invention depicted in FIG. 1. Otherwise, the solenoid valve 10 depicted in FIG. 2 is embodied identically to and functions in the same manner as the solenoid valve 10 depicted in FIG. 1. To avoid repetition, references will be made to the embodiments in FIG. 1.

The foregoing relates to preferred exemplary embodiments of the invention, it being understood that other variants and embodiments thereof are possible within the spirit and scope of the invention, the latter being defined by the appended claims.

What is claimed is:

1. A solenoid valve (10) for insertion into a receiving bore (18) of a hydraulic block (20) of an antilock hydraulic brake system of a vehicle, an extruded part valve support (14) that has a through bore (12) and can be inserted into the receiving bore (18) of the hydraulic block (20), a valve dome (26) attached to the valve support (14) coaxial to the through bore (12), in said dome an armature (24) is received so that the armature can move axially and said dome is encompassed by a coil (32), a valve tappet (28) for actuating an axially movable valve closing body (30) that is disposed on the armature (24) and protrudes into the through bore (12) of the valve support (14), a valve seat part (36, 96) which, on an end face remote from the armature (24), is inserted into the through bore (12) of the valve support (14) and which has a bore (38) that leads from the end face remote from the armature (24) to a valve seat (40) of the valve seat part (36, 96), a filter-equipped, cup-shaped end piece (46) made of rigid plastic is attached to the end of the valve support (14)

remote from the armature (24) and encompasses the valve support (14) on the end and on the circumference and has an opening (56) that leads from the end face of the end piece (46) remote from the armature to the bore (38) of the valve seat part (36), said end piece includes three seals (50, 52, 54) that are embodied as being of one piece with the end piece (46), the first seal (50), in order to seal the valve support (14), rests against the bottom of the receiving bore (18) in the hydraulic block (20), the second seal (54) rests in a sealed fashion against the valve seat part (36), and the third seal (52), in order to seal the valve support (14) in the region of a mouth of the receiving bore (18) rests against the hydraulic block (20).

2. The solenoid valve according to claim 1, in which the first seal (50) and the third seal (52) are embodied extending around an outer circumference of the end piece (46) and spaced apart from the end piece axially.

3. The solenoid valve according to claim 1, in which the end piece (46) has a pin-shaped projection (48) of one piece with it, said pin shaped projection engages in the bore (38) of the valve seat part (36), is passed through by the opening (56) of the end piece (46), and fits in sealed fashion in the bore (38) of the valve seat part (36).

4. The solenoid valve according to claim 1, in which the end piece (46) has a check valve (74, 76).

5. The solenoid valve according to claim 1, in which the valve seat part (96) is a deep-draw part made of sheet metal.

6. The solenoid valve according to claim 1, in which the valve seat part (36) is comprised of plastic.

7. The solenoid valve according to claim 1, in which the opening (56) of the end piece (46) has a throttle (58).

8. The solenoid valve according to claim 2, in which the end piece (46) has a pin-shaped projection (48) of one piece with it, said pin shaped projection engages in the bore (38) of the valve seat part (36), is passed through by the opening (56) of the end piece (46), and fits in sealed fashion in the bore (38) of the valve seat part (36).

\* \* \* \* \*